United States Patent Office 3,036,392
Patented May 29, 1962

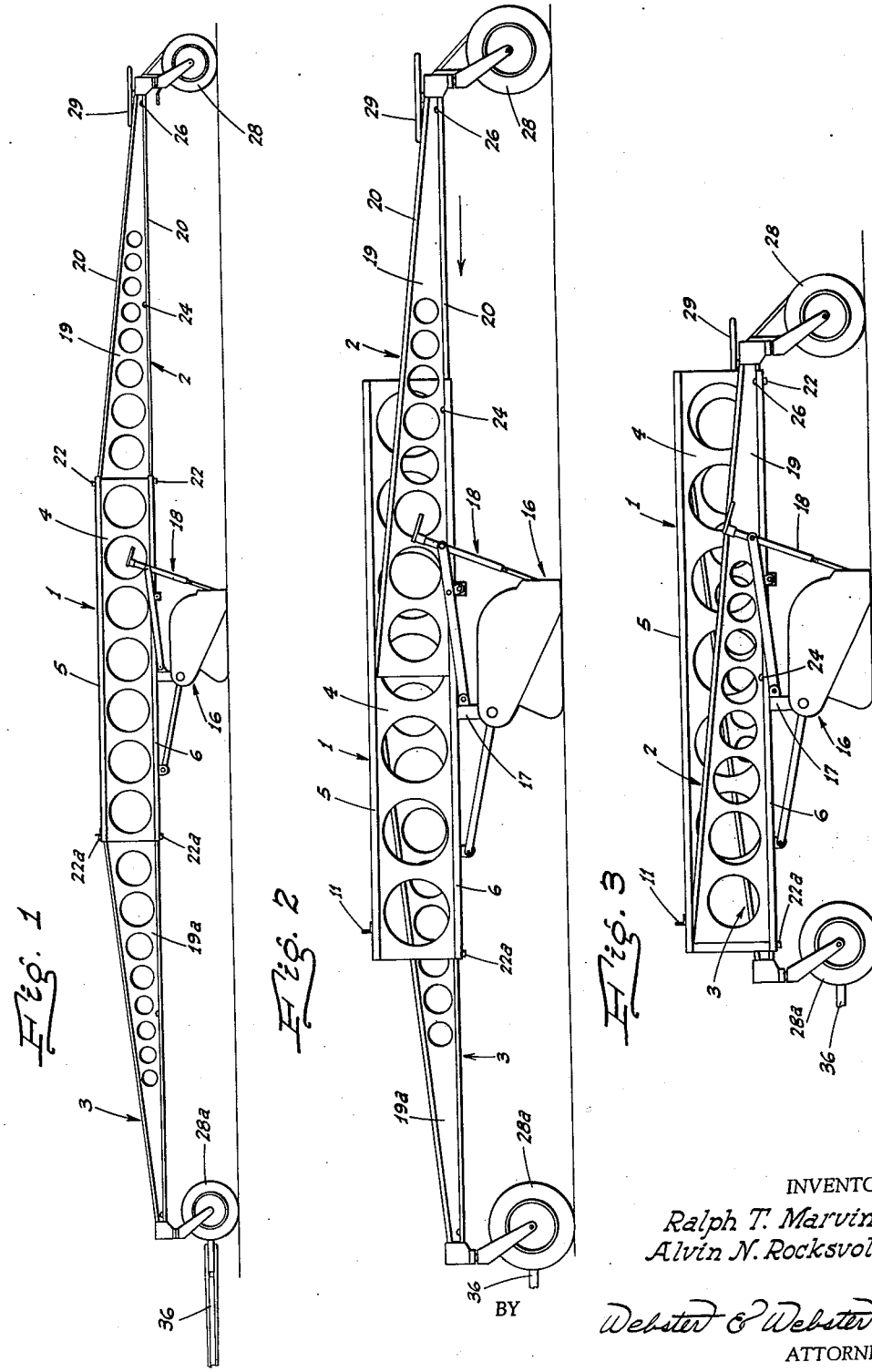

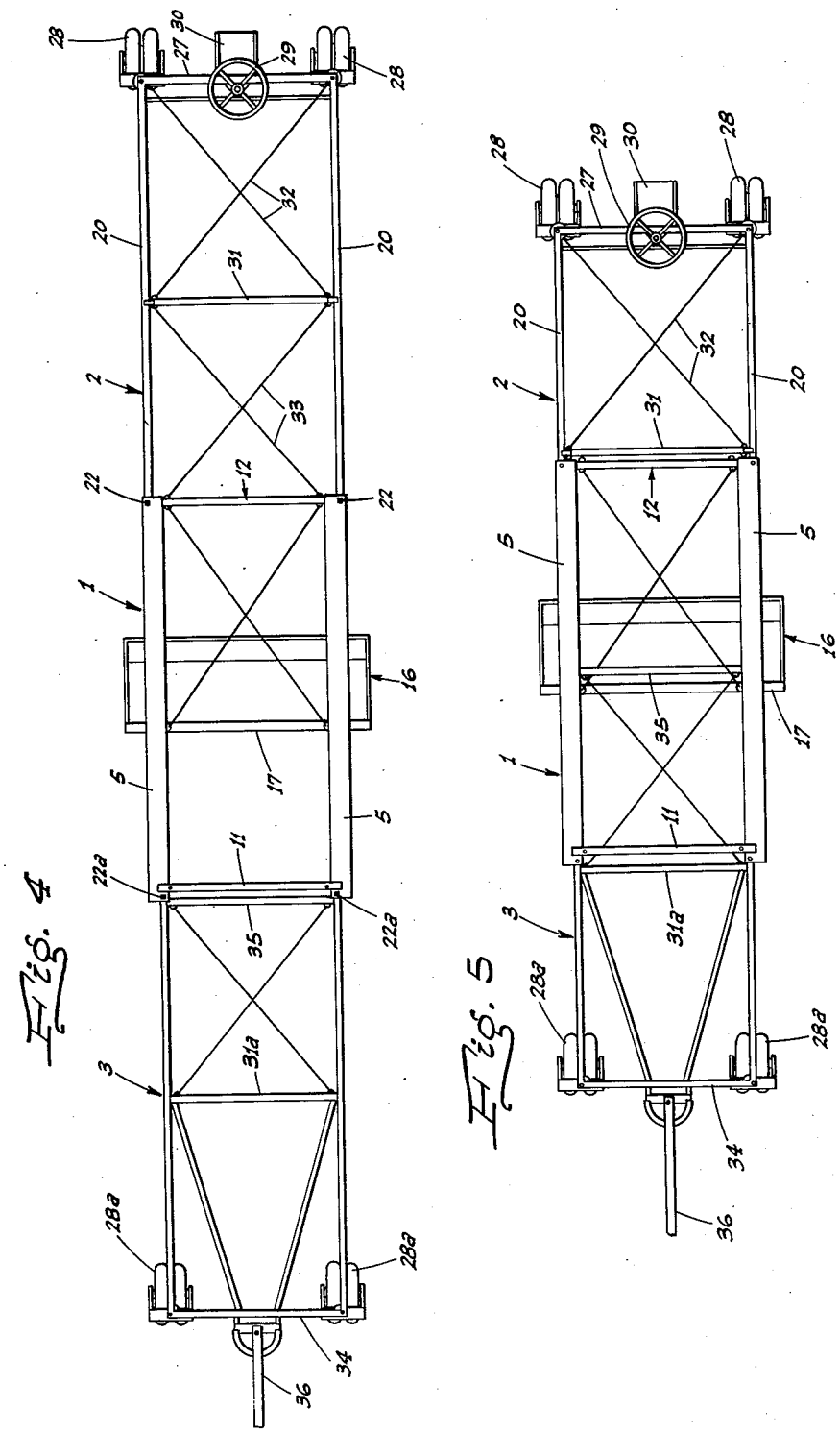

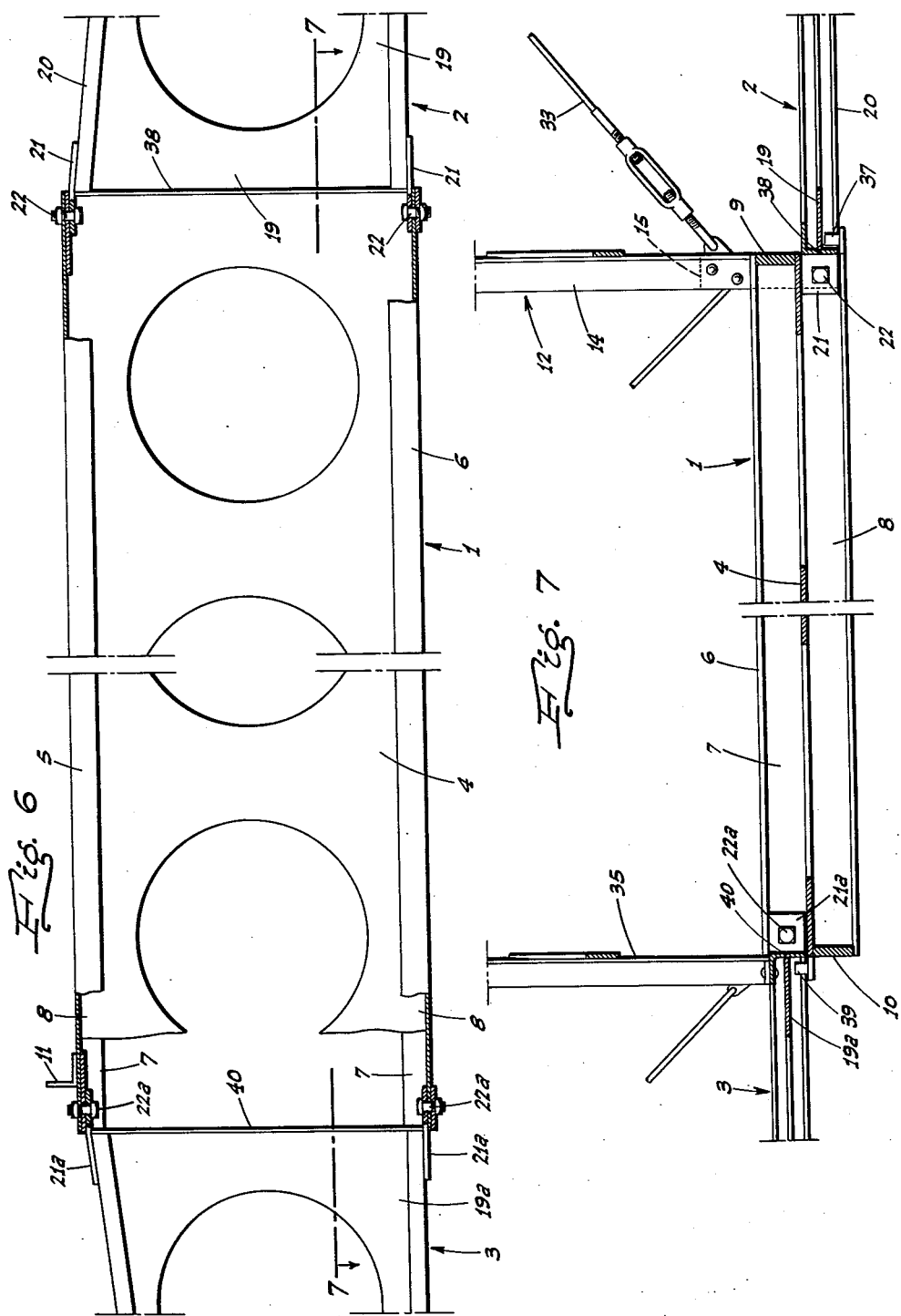

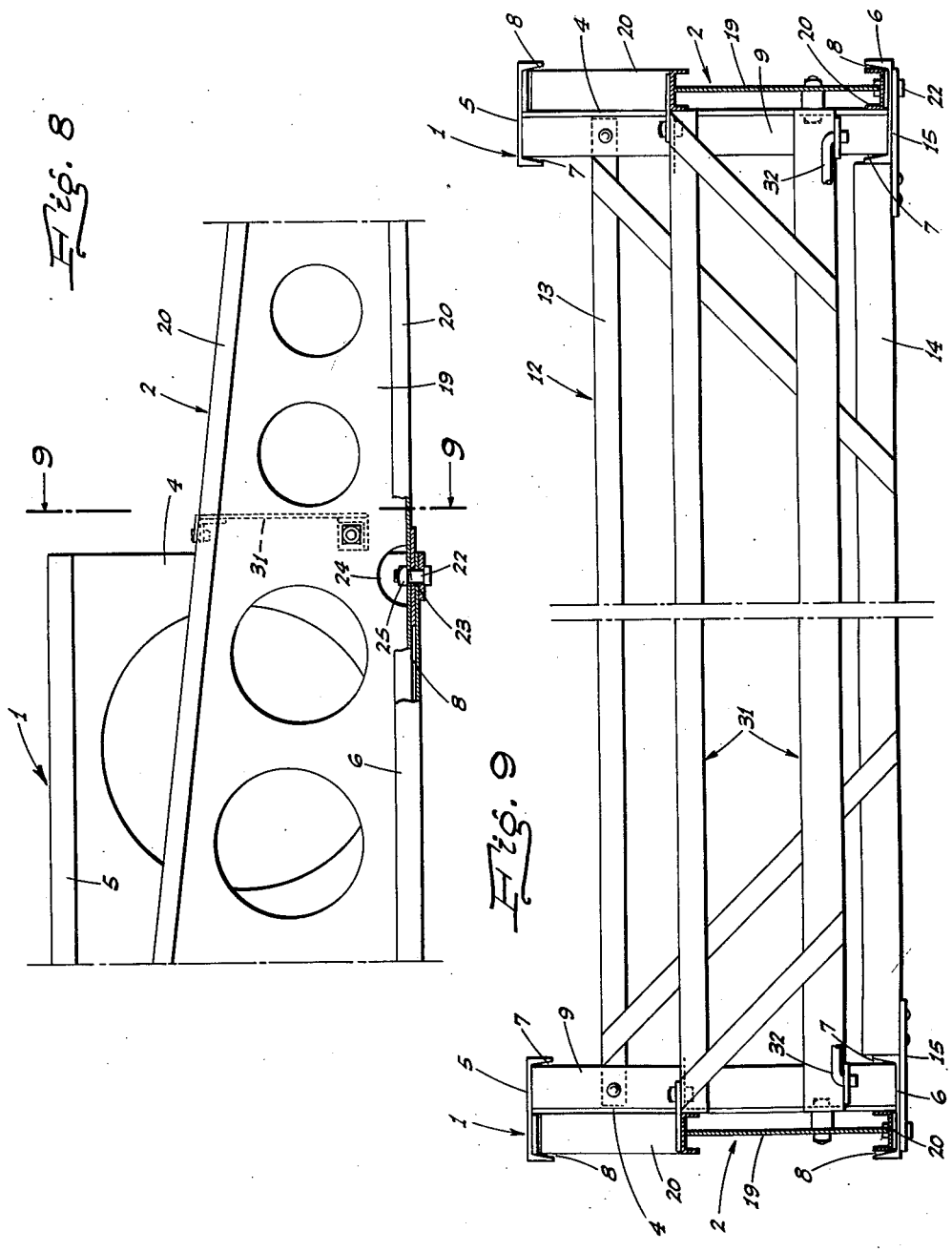

1

3,036,392
TELESCOPING LAND LEVELER
Ralph T. Marvin and Alvin N. Rocksvold, Woodland, Calif., assignors to Marvin Landplane Company, Woodland, Calif., a partnership
Filed July 19, 1960, Ser. No. 43,876
6 Claims. (Cl. 37—180)

This invention relates to land levelers of the type which comprises an elongated wheel supported frame on which a leveling blade is mounted intermediate the ends of such frame. A leveler of this general nature is shown in United States Patent No. 2,124,625.

For very accurate leveling, the frame of the leveler may be sixty feet or more in length, and—if rigid—presents difficulties in transporting the leveler from one job to another. Also, such an excessive length is not needed or desirable for certain working conditions.

It is therefore the principal object of this invention to construct the frame of the leveler in such a manner that it may be readily telescoped and shortened so that its overall length, and the wheel base, will be considerably reduced. This frame arrangement is such that highway transportation is greatly facilitated. Also, a number of different wheel base lengths may be obtained, together with different spaced relationships of the scraping or leveling blade to the supporting wheels, as may be found to be the most efficient for different leveling operations.

A further object of the invention is to construct the telescopic features of the frame in such a manner that telescoping operations may be quickly and easily carried out.

It is also an object of the invention to provide a practical, reliable, and durable telescoping land leveler, and one which will be exceedingly effective for the purpose for which it is designed.

These objects are accomplished by means of such structure and relative arrangement of parts as will fully appear by a perusal of the following specification and claims.

In the drawings:

FIG. 1 is a side elevation of the leveler with the frame fully extended and shown somewhat diagrammatically.

FIG. 2 is a similar but somewhat enlarged view, showing the frame as partly telescoped, and with the rear frame section as being moved ahead of the half-way position.

FIG. 3 is a similar view, showing the frame as fully telescoped.

FIG. 4 is a diagrammatic top plan view of the leveler with the frame fully extended, or as shown in FIG. 1.

FIG. 5 is a similar view, with the frame partly telescoped, or as shown generally in FIG. 2.

FIG. 6 is a fragmentary enlarged and side elevation of the frame of the leveler as fully extended, partly broken out and in section.

FIG. 7 is a fragmentary sectional plan taken on line 7—7 of FIG. 6.

FIG. 8 is a fragmentary enlarged side elevation of the frame of the leveler showing the rear frame section as partly telescoped in the main central frame section and secured thereto in the half-way position.

FIG. 9 is a transverse foreshortened transverse section on line 9—9 of FIG. 8.

Referring now more particularly to the drawings, and to the characters of reference marked thereon, the telescoping frame structure of the leveler comprises a main central section 1, a rear trailing section 2, and a front draft section 3; all sections being substantially the same length.

The main section 1 comprises a pair of transversely

2 spaced, elongated, upstanding side panels 4 of rectangular form. Each panel, which is of sheet metal, is stiffened along the top and bottom edges by upper and lower channel members 5 and 6, respectively, secured thereto and disposed in facing relation to each other. These channels are relatively wide, the panel 4 being disposed centrally of the width of the channels, as shown in FIGS. 7 and 9, so as to form laterally inner and outer trough-like rails or tracks 7 and 8, respectively.

A stop and stiffening bar 9 extends between the upper and lower channels 5 and 6 within the rails 7 at the rear end thereof, while a similar bar 10 is disposed within rails 8 at the front end thereof, as shown in FIG. 7. A cross bar 11 connects the top channels 5 adjacent the front end thereof, while a cross brace unit 12 extends between the panels 4 at the rear end thereof. This unit includes a top cross bar 13 connected to the opposed bars 9 toward the upper end thereof, and a lower cross bar 14 secured to plates 15 which project laterally inward from and are secured to the lower channels 6, as shown in FIG. 9.

A leveling blade unit 16 of a generally conventional form is disposed below the frame section 1 substantially centrally of its ends; said unit being connected at its forward end to a cross beam 17 extending between and secured to the lower channel members 6, and at its rear end being engaged by a vertical adjustment means 18 of any suitable type.

The rear frame section 2 comprises a pair of transversely spaced sheet metal side panels 19 stiffened along their upper and lower edges by shoes 20 of a width to fit and slide within the trough-like rails 8.

The lower shoe of each panel 19 is horizontal, while the upper shoe—and of course the upper edge of panel 19—slopes downwardly from its forward end to give the frame when extended a truss-like appearance. Upper and lower flat ears 21 project forwardly from the forward ends of shoes 20 and are spaced vertically to slidably fit within the opposed laterally inner trough rails 8. The ears are releasably secured to said rails at their rear ends by bolts 22 projecting vertically through said ears and the related channels 5 and 6, as shown particularly in FIG. 6; the rear section 2 being then fully extended relative to the main section 1.

When the bolts 22 are removed, the panels 19 may be slid forwardly along section 1, and when at substantially a half-way point along said section the lower bolts 22 may be projected through holes 23 in the shoes 20; the panels 19 having openings 24 therethrough above said holes to expose the upper ends of the bolts and receive the nuts 25 thereof, as shown in FIG. 8. The panels adjacent their rear ends are similarly orificed, as at 26, to receive said lower bolt nuts when the sections 2 are fully telescoped.

At their rear ends the panels 19 are rigidly connected by a cross member 27, which of course is rearwardly of the panel openings 26 a sufficient distance to avoid interference with the rear cross unit 12 of frame section 1 when the frame section 2 is fully telescoped and the bolts 22 are connected to the panel at said openings 26.

Caster wheels 28 are mounted on frame section 2 at the rear end thereof, such wheels being steered by suitable connection with a steering wheel 29 mounted on the cross member 27 and manipulated by an operator standing on a platform 30 supported from and disposed below said member 27.

Just rearwardly of the bolt-nut openings 24, the panels 19 are connected by a detachable cross brace unit 31, which—like the rear cross member 27—does not interfere with the cross unit 12 when frame section 2 is partially telescoped and the bolts 22 are connected to panels 19 at the bolt-nut openings 24. Diagonal cross brace rods 32 are detachably connected between the cross member 27 and the cross brace unit 31, and similar cross brace rods 33 are detachably connected between said cross unit 31 and the rear cross unit 12 of the main frame section 1 when the rear section 2 is fully extended, as shown in FIG. 4.

When it is desired to partially telescope the rear section 2, the bolts 22 are of course first withdrawn, and the brace rods 33 are detached and removed. The section 2 is then advanced until the cross brace unit 31 reaches brace unit 12, as shown in FIG. 5, and the bolts 22 may be connected to the panels 19 at the bolt holes 23, as shown in FIG. 8. Even though only the lower bolts 22 are used for this connection, the frame sections 1 and 2 will remain substantially level, since the upper ears 21 at the forward end of section 2 bear against the bottom of the upper trough rails 8 when the section 2 is slid forwardly; the bolts 22 being then under tension. While this is being done, the weight of the frame section 1 is taken by the blade 16, which is adjusted if necessary to rest on the ground, while maintaining frame section 1 in a horizontal position.

When it is desired to fully telescope the rear section 2, the cross brace unit 31, and the rear diagonal brace rods 32, must be removed to enable the panels of said section to overlap the panels of section 1 to their full extent, as shown in FIG. 3, so that the bolts 22 may secure the sections 1 and 2 together at the bolt holes alined with the rear nut opening 26.

The front frame section 3 is practically a duplicate of section 2 except that since the side panels 19a of section 3 are spaced to slide along the laterally inner trough rails 7 of the main frame section 1, it is of course unnecessary for any cross members or braces of said section 3 to be detached when the section is telescoped into the main section 1.

Section 3 thus comprises, besides the panels 19a, a front-end cross member 34, an intermediate cross brace unit 31a, and a rear-end cross brace unit 35. Section 3, at its forward corners, is supported by caster wheel units 28a, and a tongue 36—adapted for connection to a draft tractor—projects forwardly from the front cross member 34.

Section 3 also includes the rear-end upper and lower ears 21a projecting into the trough rails 7 and releasably connected—when the section 3 is fully extended—by bolts 22a to the related channels 5 and 6 of the main frame section 1. See FIG. 6.

Also, section 3 is arranged to be detachably secured to section 1 in partially or fully telescoped positions in the identical manner described in connection with the structure of the rear section 2, and as indicated in FIGS. 2 and 3.

In order to prevent the sections 2 and 3 from being possibly pulled out from section 1 far enough to disengage the ears 21 or 21a from their rails, a laterally projecting stop 37 is mounted on each channel 6 to extend part way across the adjacent trough rail 8 at its rear end and engage a transverse upstanding stiffening member 38 on the adjacent panel 19 of section 2 at its forward end from behind, as shown in FIG. 7.

A similarly mounted stop 39 extends part way across each trough rail 7 at its forward end to engage, from in front, a transverse upstanding stiffening member 40 on the adjacent panel 19a of section 3 at its rear end.

The panels of all the frame sections are freely perforated, as shown, in order to lighten the same.

Since there is no direct connection between the frame sections 2 and 3, they may be independently adjusted or telescoped to provide an implement of a number of different lengths.

Assuming, for instance, that each section is twenty feet long, the implement when fully extended will be substantially sixty feet long, as shown in FIGS. 1 and 4. With this setting of the frame sections, precision leveling is obtained. When the rear section 2 only is telescoped half way, the length of the implement is reduced to fifty feet. With this setting, the implement is admirably adapted for road leveling, as well as first-cut leveling on large fields.

When the front section 3 is also telescoped half way, as shown in FIGS. 2 and 5, the length of the implement is further reduced to forty feet. The implement is then of an ideal length for operation on smaller fields where relatively great maneuverability is required.

If the rear section 2 is fully telescoped while leaving the front section 3 only partially telescoped, the length of the implement is reduced to thirty feet. This is an advantageous length for first-cut leveling on rough land.

When both frame sections 2 and 3 are fully telescoped, the length of the implement is reduced to the minimum of approximately twenty feet. Highway transportation of the implement is then feasible and a simple matter, and such implement—when set at this length—may also be used for leveling small fields.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A land leveler comprising an elongated frame which includes a central section and end sections projecting from the central section, a leveling blade mounted on the central section, wheels supporting the end sections at their outer ends, and means mounting at least one of the end sections on the central section for telescopic movement relative thereto while preventing relative vertical movement of the sections; the main frame section comprising a pair of transversely spaced vertical panels, means rigidly connecting said panels at spaced points along their length, means forming full-length parallel and horizontal tracks along the upper and lower edges of the panels on opposite sides thereof, one end section comprising a pair of connected side panels spaced transversely to correspond to the spacing of the laterally inner tracks of the central section, and members on said side panels slidably engaging said inner tracks; the other end section comprising a pair of side panels permanently connected at their outer ends only and spaced transversely to correspond to the spacing of the laterally outer tracks of the central section, and members on the last named side panels slidably engaging said outer tracks; and means detachably connecting the members of each end section to the corresponding tracks.

2. A leveler, as in claim 1, with a detachable cross-brace unit connecting the side panels of the other end section intermediate the ends of said panels.

3. A leveler, as in claim 1, in which the track forming means comprises channels secured on said upper and lower edges of the panel of the central section and disposed in facing relation, said channels being of a width to leave troughs on opposite sides of the panel and in which troughs the members of the end sections slide.

4. A structure, as in claim 3, in which the lower edges of the side panels of the end sections are horizontal while the upper edges of said panels slope down toward the outer ends thereof; the trough engaging members of each panel comprising a shoe extending along the lower edge of the panel and riding in the corresponding lower trough, and an ear fixed in and projecting from the inner end of the panel at the top and slidably engaging in the corresponding upper trough.

5. A land leveler comprising an elongated frame which comprises a main central section having a leveling blade unit mounted thereon, a front end section and a rear end section, said main section including transversely spaced side panels, means rigidly connecting said panels at spaced points in their length, the front end section being wheel-supported at its front end and including transversely spaced side panels whose spacing is less than that of the panels of the main section whereby said front end section may telescope into the main section, means connecting the side panels of the front end section in rigid relation at a level to avoid conflict with the connecting means of the panels of the main section, cooperating members on the sections slidably guiding and supporting the same relative to each other and preventing relative movement thereof vertically and transversely; the rear end section being wheel-supported at its rear end and comprising a pair of side panels spaced apart a greater distance than the spacing of the panels of the main section whereby the rear end section may telescope over the main section, cooperating members on the main and rear end sections slidably guiding and supporting the same relative to each other and preventing relative movement thereof vertically and transversely, a permanent connection between the panels of the rear end section at the rear end thereof, and detachable brace means connecting the last named panels ahead of said permanent connection.

6. A land leveler comprising an elongated frame which includes a central section and end sections projecting therefrom, all the sections being substantially the same length, a leveling blade mounted on the central section, wheels supporting the end sections at their outer ends, and means mounting the end sections on the central section for independent and telescoping movement of said end sections at the same time into said central section; said means including side members on each end section, the members on one section being offset laterally inward from the members of the other section and arranged so that the members of each section may telescope for substantially their full length into the central section without interfering with the telescoping movement of the members of the other section while preventing relative vertical movement of the sections.

References Cited in the file of this patent

UNITED STATES PATENTS

| | | |
|---|---|---|
| 642,991 | Macfee | Feb. 6, 1900 |
| 2,124,625 | Marvin | July 26, 1938 |
| 2,197,401 | Weber | Apr. 16, 1940 |
| 2,420,319 | Lichtenberg et al. | May 13, 1947 |
| 2,464,227 | Gurries et al. | Mar. 15, 1949 |
| 2,526,130 | Gurries et al. | Oct. 17, 1950 |
| 2,648,920 | Anderson | Aug. 18, 1953 |
| 2,719,369 | Lindbeck | Oct. 4, 1955 |
| 2,801,864 | Raney et al. | Aug. 6, 1957 |
| 2,842,972 | Houdart | July 15, 1958 |
| 2,870,555 | Gurries et al. | Jan. 27, 1959 |

FOREIGN PATENTS

| | | |
|---|---|---|
| 575,666 | Great Britain | Feb. 27, 1946 |
| 833,567 | Germany | Mar. 10, 1952 |